United States Patent
El-Hibri et al.

(10) Patent No.: US 9,845,383 B2
(45) Date of Patent: Dec. 19, 2017

(54) FASTENERS

(71) Applicant: SOLVAY SPECIALTY POLYMERS USA, LLC, Alpharetta, GA (US)

(72) Inventors: Mohammad Jamal El-Hibri, Atlanta, GA (US); David B. Thomas, Atlanta, GA (US)

(73) Assignee: Solvay Specialty Polymers USA, LLC, Alpharetta, GA (US)

( * ) Notice: Subject to any disclaimer, the term of this patent is extended or adjusted under 35 U.S.C. 154(b) by 0 days.

(21) Appl. No.: 14/653,655

(22) PCT Filed: Dec. 18, 2013

(86) PCT No.: PCT/EP2013/077179
§ 371 (c)(1),
(2) Date: Jun. 18, 2015

(87) PCT Pub. No.: WO2014/096059
PCT Pub. Date: Jun. 26, 2014

(65) Prior Publication Data
US 2015/0299422 A1    Oct. 22, 2015

Related U.S. Application Data

(60) Provisional application No. 61/740,328, filed on Dec. 20, 2012.

(30) Foreign Application Priority Data

Feb. 12, 2013   (EP) .................................... 13154980

(51) Int. Cl.
*A61F 2/02*    (2006.01)
*A61F 2/28*    (2006.01)
(Continued)

(52) U.S. Cl.
CPC .................. *C08K 3/38* (2013.01); *B29D 1/00* (2013.01); *B29D 5/00* (2013.01); *C08K 7/06* (2013.01);
(Continued)

(58) Field of Classification Search
None
See application file for complete search history.

(56) References Cited

U.S. PATENT DOCUMENTS

| | | | | |
|---|---|---|---|---|
| 4,654,263 | A * | 3/1987 | Cox | ......................... C08K 3/38 428/366 |
| 2009/0163955 | A1 * | 6/2009 | Moumene | ............ A61B 17/701 606/257 |
| 2010/0241166 | A1 * | 9/2010 | Dwyer | ............... A61B 17/7068 606/249 |

FOREIGN PATENT DOCUMENTS

DE    10039480 A1    5/2001
EP       157466 A1    10/1985

OTHER PUBLICATIONS

CRC Handbook of Chemistry and Physics $96^{th}$ edition, Electronegativity, p. 9-97.*

(Continued)

*Primary Examiner* — Peter A Salamon
(74) *Attorney, Agent, or Firm* — Jarrod N. Raphael

(57) ABSTRACT

A fastener comprising a polymer composition [composition (C)] comprising at least one polyaryletherketone polymer [(PAEK) polymer], and at least one nitride (NI) of an element having an electronegativity ($\epsilon$) of from 1.3 to 2.5, as listed in <<Handbook of Chemistry and Physics>>, CRC Press, $64^{th}$ edition, pages B-65 to B-158, based on the total weight of the composition (C).

13 Claims, 4 Drawing Sheets

(51) Int. Cl.
  *A61F 2/36*     (2006.01)
  *C08K 3/38*     (2006.01)
  *F16B 33/00*    (2006.01)
  *B29D 1/00*     (2006.01)
  *B29D 5/00*     (2006.01)
  *C08K 7/06*     (2006.01)
  *F16B 19/00*    (2006.01)
  *F16B 37/00*    (2006.01)
  *F16B 43/00*    (2006.01)
  *C08L 9/02*     (2006.01)
  *B29K 71/00*    (2006.01)
  *B29K 105/12*   (2006.01)
  *B29K 307/04*   (2006.01)
  *B29K 309/02*   (2006.01)
  *B29K 309/08*   (2006.01)

(52) U.S. Cl.
  CPC ............... *C08L 9/02* (2013.01); *F16B 19/00* (2013.01); *F16B 33/006* (2013.01); *F16B 37/00* (2013.01); *F16B 43/00* (2013.01); *B29K 2071/00* (2013.01); *B29K 2105/12* (2013.01); *B29K 2307/04* (2013.01); *B29K 2309/02* (2013.01); *B29K 2309/08* (2013.01); *B29K 2995/0078* (2013.01); *B29K 2995/0079* (2013.01); *B29K 2995/0082* (2013.01); *C08G 2650/40* (2013.01); *C08K 2003/382* (2013.01); *C08K 2003/385* (2013.01)

(56) References Cited

OTHER PUBLICATIONS

Weast R.C. in "Handbook of Chemistry and Physics", CRC Press, 1983, 64th Edition, pp. B-65 to B-158.

Murphy J., in "Additives for Plastics Handbook", 2nd Edition, 2001, Chapter 5.2.3., p. 43-48—Elsevier Advanced Technology.

Nassau K., "Color", Kirk-Othmer Encyclopedia of Chemical Technology, 2004, vol. 7, p. 303-341, John Wiley & Sons, Inc.

\* cited by examiner

FASTENERS

This application claims priority to U.S. provisional application No. 61/740,328 filed on 20 Dec. 2012 and to European application No. 13154980.0 filed on 12 Feb. 2013, the whole content of each of these applications being incorporated herein by reference for all purposes.

FIELD OF INVENTION

The present invention relates to fasteners made of a poly(aryletherketone) polymer composition wherein said poly(aryletherketone) polymer composition is characterized by having improved mechanical properties, in particular having an excellent balance of stiffness and ductility, and said fasteners have higher tensile and flexural modulus as well as strength and moreover very good aesthetical properties, especially improved lighter colors.

BACKGROUND OF THE INVENTION

Fasteners of multiple designs, including nuts, screws, clips, rivets and many other varieties, have been made available depending on the particularly encompassed application. A common feature thereof lies in the particularly stringent requirements associated herewith.

Indeed, during their life, any fasteners, including notably unthreaded and threaded fasteners, are notably submitted to harsh mechanical conditions: they are often stretched, twisted and bent. Fasteners are further generally submitted to various aggressive environmental, such as vibrations, thermal cycles and/or chemical attacks, which can alter their mechanical performances over time, and, in the worst scenarios, cause fasteners to be literally "lost".

A class of fasteners of particular importance is threaded fasteners that face with additional specific problems. When threaded fasteners are tightened, we pump energy into them, and, after we let go, this energy is held therein by friction constraints. Typically, these ones are concentrated to a large extent in the fastener threads, which yet often represent the most delicate portions of the fastener as the result of their fineness. Aggressive environmental factors as above recited can cause threaded fasteners to loose all their preload and literally be lost ("loosening" problem). Somewhat related to loosening is thread stripping, another failure which occurs when threaded fasteners are over-tightened; thread stripping is characterized by a deformation (alteration) of the fastener threads, typically resulting in a decrease of performance.

Certain fasteners, including certain unthreaded and threaded fasteners, can have complex designs, and shaping/machining them from an appropriate material can be a tough matter. In case of threaded fasteners, forming fine and regular threads has proved to be particularly uneasy.

Material selection is crucial for fasteners.

Metal fasteners present however a certain number of disadvantages. Metal fasteners are heavy which is of a disadvantage in applications where weight is a concern, such as notably in aircrafts applications. Metal fasteners are in general also prone to corrosion and are electrically conductive. Machining complex shapes from a metal, as well as forming fine and regular threads, is also a tough matter.

Thus for several reasons, as listed above, polymeric materials are useful metal replacements.

However, it is important that said fasteners are made from polymeric materials that are easy to process into fasteners and that said polymeric materials are able to provide the required level of mechanical properties, in particular having especially an excellent balance of stiffness and ductility, a high elongational strength, a high flexural strength and, last but not least, a high torsional strength (or torque) which is related to the inherent shear strength of the material. Indeed, for many fasteners, including but not limited to threaded fasteners, load bearing ability is typically a function of the shear or torsional strength of the material of construction.

It is known that carbon fiber-reinforced polyetheretherketone (PEEK) compositions have already been used to replace aluminum, brass, steel and stainless steel fasteners in a wide variety of applications such as notably in aerospace applications.

It is known that in the manufacturing of fasteners, using different processing technologies, such as notably injection molding or extrusion, the crystallization rate of said PAEK polymer plays an important role. A slightly slower crystallization rate can already result in the manufacturing of fasteners, in particular in small portions of said fastener, having for instance non-uniformity defects such as notably appearance and color non-uniformities, as well as skin-core variation effects wherein the threaded screw, for example would be more amorphous near the wall and more crystalline neat the center. This leads to the peripheral section of the screw having the limiting shear strength in the molding overall.

There remains a continuous need for fasteners made of polymeric compositions wherein said fasteners features an excellent balance of stiffness and ductility, high torque, high practical toughness (high tensile elongation), high elongational capability in tension and under impact loads, high strength, high chemical resistance, light weight, and uniform crystallinity which can be easily formed by melt-processing techniques, such as extrusion or injection-molding, including when the parts of concern have a complex shape and/or very thin portions (e.g. threads, or when an extruder with small orifices must be used). Last but not least, the polymeric materials need to be as low in specific gravity as possible, due to the criticality of light weight and energy efficiency of the current and future generations of aircraft. In these cases, the use of a glass fiber reinforced resin with a relatively high loading of glass reinforcement (i.e. 20% or more) can become disadvantageous from a unit weight and mobility standpoint as these reinforcements significantly increase the density of the composition relative to the corresponding unfilled polymer. Carbon fiber can mitigate this effect due to its lower density relative to glass fiber, but on the other hand carbon fiber-reinforced plastics have an electrical conductivity issue which can lead to galvanic corrosion of mating aluminum structures exist. This limits the range of utility of carbon fiber-reinforced PEEK. Reinforced plastics like PEEK reinforced with glass fiber and carbon fiber, for example, suffer from the fact that the composition has non-uniform properties over the various locations of the part, depending on how the fibers are oriented and how the finished part is fabricated. Strength and stiffness properties are very high in the direction of flow or direction of alignment of the fibers and much weaker properties are realized perpendicular to the orientation of these fibers. The strong anisotropy just mentioned also leads to warpage issues in injection molded parts as different portions or dimensions of the part may shrink differently depending on the state of fiber alignment in that particular direction. There is therefore a need in the art for reinforcements or fillers that do not impart this kind of high anisotropic character to the compositions used in fasteners used for aircraft and aerospace applications.

BRIEF DESCRIPTION OF THE FIGURES

For a detailed description of the invention, reference will now be made to the accompanying drawings in which.

SUMMARY OF INVENTION

Figure 1:
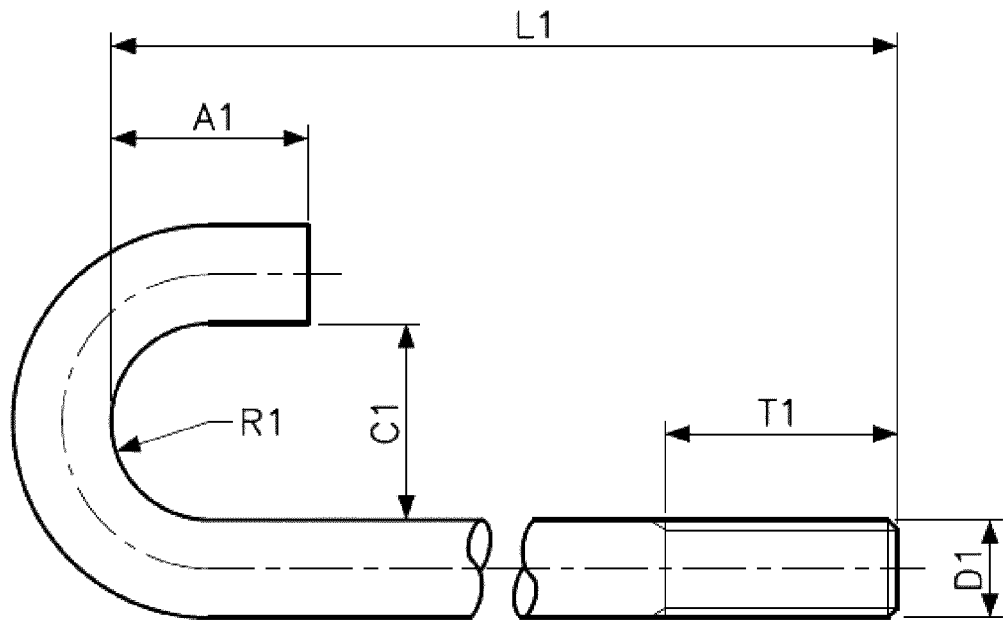
FIG. 1 represents an example of a hook bolt, round bent; A, L, R, C, T and D are the characteristic dimensions of said hook bolt.

The present invention addresses the above detailed needs and relates to a fastener comprising a polymer composition [composition (C), herein after] comprising
(i) at least one polyaryletherketone polymer [(PAEK) polymer],
(ii) at least one nitride (NI) of an element having an electronegativity ($\epsilon$) of from 1.3 to 2.5, as defined in <<Handbook of Chemistry and Physics>>, CRC Press, $64^{th}$ edition, pages B-65 to B-158.

The Fastener (F)

All the terms as herein used to describe the fastener (F) are well familiar to the skilled person, and should be understood under their common meaning.

The fastener (F) is generally a mechanical device designed specifically to hold, join, couple, assemble or maintain equilibrium of single or multiple components. The resulting assembly may function dynamically or statically as a primary or secondary component of a mechanism or structure. Based on the application intended, the fastener (F) may receive varying degrees of built-in precision and engineering capability, ensuring adequate, sound service under planned, pre-established environmental conditions.

The weight of the composition (C), based on the total weight of the fastener (F), is usually above 10%, preferably above 50% and more preferably above 90%. Still more preferably, the fastener (F) consists essentially of the composition (C). The most preferably, the fastener (F) consists of composition (C).

The fastener (F) may consist of one part, i.e. it is a single-component device. Then, the single part consists of the composition (C). Alternatively, the fastener (F) may consist of several parts. The case being, either one part or several parts of the fastener (F) may consist of the composition (C). When several parts of the fastener (F) consist of the composition (C), each of them may consist of the very same composition (C); alternatively, at least two of them may consist of different composition (C) in accordance with the invention.

The fastener (F) can be a threaded fastener, i.e. a fastener that contains threads.

Threads are typically ridges (i.e. raised lines or strips) or grooves or ribs that are present on at least part of the surface of a threaded fastener. Threads can have different forms, including spiral, helical or parallel. Threads can notably be present around the circumference of certain screws, bolts and nuts.

Advantageously, at least part of the threads contained in the fastener (F) is composed of the composition (C). Preferably, essentially all the threads contained in the fastener (F) are composed of the composition (C). More preferably, all the threads contained in the fastener (F) are composed of the composition (C).

The threaded surface of a threaded fastener in accordance with the present invention, in particular when essentially all its threads are composed of the composition (C), can represent above 1%, above 2%, above 5%, above 10%, above 20%, above 30%, above 40%, above 50%, above 60%, above 70%, above 80%, above 90%, above 95%, above 99% or about 100% of the whole surface developed by said threaded fastener.

The fastener (F) can be externally threaded, i.e. it can have threads formed on at least part of the outside of a cylinder or other volume, such as on bolts and screws. The threaded surface of an externally threaded fastener in accordance with the present invention, in particular when essentially all its threads are composed of the composition (C), can represent above 1%, above 2%, above 5%, above 10%, above 20%, above 30%, above 40%, above 50%, above 60%, above 70%, above 80%, above 90%, above 95%, above 99% or about 100% of the external surface developed by said externally threaded fastener.

The fastener (F) can be internally threaded, i.e. it can have threads formed on at least part of the inside of a cylinder or other volume, such as on nuts. The threaded surface of an internally threaded fastener in accordance with the present invention, in particular when essentially all its threads are composed of the composition (C), can represent above 1%, above 2%, above 5%, above 10%, above 20%, above 30%, above 40%, above 50%, above 60%, above 70%, above 80%, above 90%, above 95%, above 99% or about 100% of the interior surface developed by said internally threaded fastener.

The fastener (F) can be both internally and externally threaded, i.e. it can have threads formed on at least part of the outside of a cylinder or other volume, and threads formed on at least part of the inside of said cylinder or other volume, such as certain internally and externally threaded bushings.

In one embodiment, the fastener (F) is a threaded fastener, with outstanding results being obtained when essentially all the threads of the threaded fastener are composed of composition (C) and the threaded surface of the threaded fastener represents above 10%, preferably above 20%, and more preferably above 50% of its whole surface.

Common types of threaded fasteners in accordance with the present invention include bolts, nuts, screws, headless set screws, scrivets, threaded studs and threaded bushings.

The fastener (F) can be a bolt. A bolt is typically a headed, externally threaded fastener. A bolt is generally designed for insertion through holes in assembled parts to mate with a nut, and is normally intended to be tightened or released by turning that nut.

Certain bolts in accordance with the present invention are qualified as "bent bolts" in reference to their shape. Bent bolts may be notably in the shape of a "U", "J", "L", or eyebolts. "U" shaped bolts have typically threads at their both ends, while the other cited bent bolts have typically threads at only one end.

Other bolts in accordance with the present invention are:
square bolts, in reference to the shape of their head which is square;
hex bolts, in reference to the shape of their head which is hexagonal;
hex flange bolts, which are similar to hex bolts but contain a washer-like flat surface that mates with a substrate;
round head bolts, which have typically a rounded headed at one end; among them, it can be distinguished notably between round head short square neck bolts, round head ribbed neck bolts, round head fin neck bolts, step bolts, countersunk bolts and slotted countersunk bolts, flat countersunk head elevator bolts, T-head bolts, plow bolts and track bolts;
eyebolts, which have typically a looped head designed to receive a hook or rope, as in the exemplified hook bolt of FIG. 1.

The fastener (F) can be a nut. A nut is typically a perforated block possessing an internal, or female, screw thread, intended for use on an external, or male, thread such as a bolt for the purpose of tightening or holding two or more bodies in definite relating positions.

Certain nuts in accordance with the present invention are flange nuts. Flange nuts have typically a wide flange at one end that acts as an integrated, non-spinning washer; this serves usually to distribute the pressure of the nut over the part being secured, reducing the chance of damage to the part and making it less likely to loosen as a result of an uneven fastening surface. The flange is commonly serrated to provide a locking action.

Certain other nuts in accordance with the present invention are coupling nuts. Coupling nuts are typically long nuts tapped from each side to meet in the middle, rather than all the way through in the same direction, which can be used to connect two threaded rods end to end.

Still certain other nuts in accordance with the present invention are wing nuts, also called thumbnuts. These ones are typically nuts with wing like projections for thumb and forefinger leverage in turning.

The fastener (F) can be a screw. A screw is typically a headed and externally threaded fastener. It has usually capabilities which permit it to be inserted into holes in assembled parts, of mating with a preformed internal thread or forming its own thread, and of being tightened or released by torquing its head.

Certain screws in accordance with the present invention are socket screws. Socket screws are typically screw caps with a hex, spline, or special hole in the top that requires a matching "screwdriver tip".

Certain other screws in accordance with the present invention are tapping screws. Tapping screws are able to "tap" their own mating internal thread when driven into preformed holes in various materials. Tapping screws are typically high strength, one-piece, one-side-installation threaded fasteners. Because they can form or cut their own mating thread, there is unusually good thread fit which enhances resistance to their loosening in service. Tapping screws in accordance with the present invention can be disassembled and are generally reusable.

Still other screws in accordance with the present invention are machine screws. Machine screws have typically a thread along the entire length of their shaft; they can also be viewed as screws with a tapered top that fits into a countersunk hole and when screwed in is flush with the surface being screwed into.

Still other screws in accordance with the present invention are thumb or wing screws, i.e. screws which are typically designed so that they can be turned with the thumb and fingers.

Still other screws in accordance with the present invention are qualified as "wood screws", in that they have typically a pointed shank, a slotted or recessed head, and a sharp tapered thread of relatively coarse pitch suitable for use essentially, if not only, in wood.

Still other screws in accordance with the present invention are qualified as miniature screws by reference to their tiny size. Among said miniature screws, it can be notably cited fillister heads, pan head, flat heads and binding heads.

Screw-washer assemblies (SEMS) wherein at least the screw comprises the polymer material (M) form also part of the present invention.

The fastener (F) can be a headless set screw. In contrast with the screw in accordance with the present invention as above defined which is typically headed, the present headless set screw has no projecting head. In general, its top is either slotted or provided with a socket.

The fastener (F) can be a threaded stud. A threaded stud is typically a fastening device with one pointed end driven into a material, such as concrete, and the other end is threaded and extends above the surface for the attachment of structural members.

Figure 2:
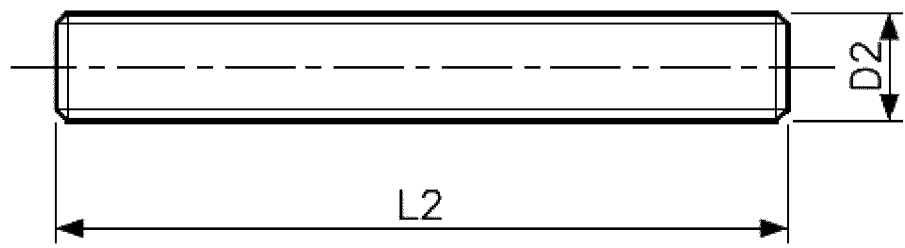
FIG. 2 represents an example of a continuous thread stud in accordance with the present invention.

Certain threaded studs in accordance with the present invention are continuous thread studs, i.e. they are threaded from end to end, and are often used for flange bolting with two nuts applied. FIG. 2 shows an example of a general purpose continuous thread stud in accordance with the present invention.

Points of continuous thread studs in accordance with the present invention are generally flat and chamfered. Continuous thread studs in accordance with the present invention can notably be used for piping applications; then, as required for these applications, these ones have a length measurement requirement different from all other studs, i.e., their length is measured from first thread to first thread, exclusive points.

Figure 3:
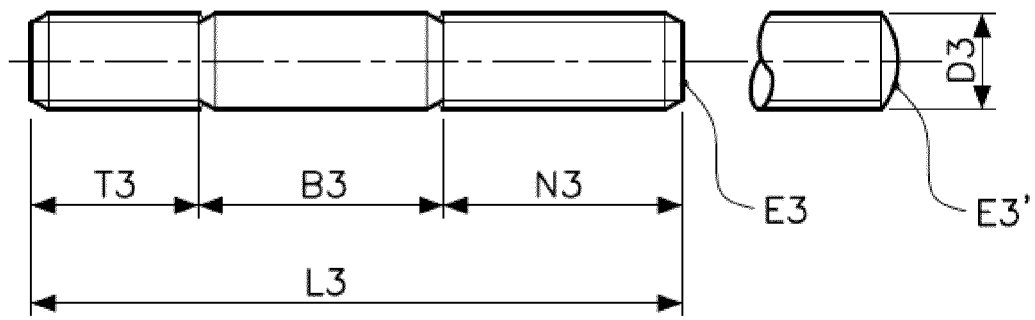
FIG. 3 represents an example of a tap-end stud in accordance with the present invention.

Certain other threaded studs in accordance with the present invention are tap-end studs. Typical tap-end studs have a short thread on one end, called the tap end which is threaded to a certain Class fit (this end is suitable for screwing into a tapped hole), while the other or nut end is threaded with another Class fit. The tap end has a chamfered point, but the nut end may have either a chamfered or round point. FIG. 3 shows an example of a tap-end stud in accordance with the present invention.

Figure 4:
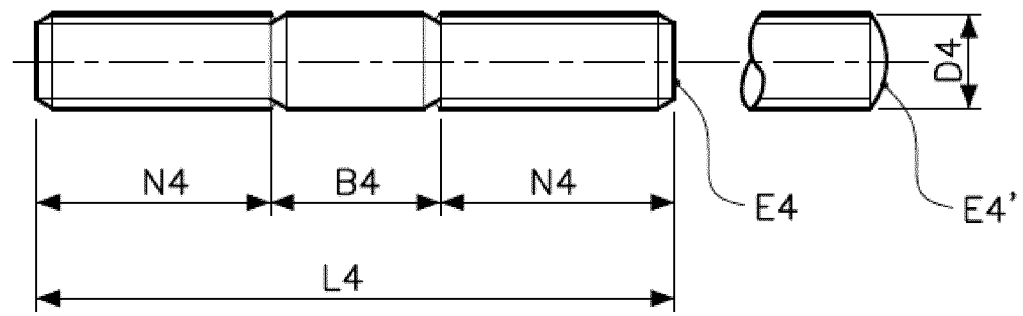
FIG. 4 represents an example of a tap-end stud in accordance with the present invention.

Still other threaded studs in accordance with the present invention are double-end studs. Double-end studs have typically substantially equal-length or equal-length threads on each end to accommodate a nut and are threaded to a certain Class fit. Both ends may have independently from each other chamfered points or round points. Double-end studs are useful for flange bolting or other applications where torching from both ends is necessary or desirable. FIG. 4 shows an example of a double-end stud in accordance with the present invention.

The fastener (F) can be a scrivet. Scrivets are typically threaded fasteners that comprise an at least partially threaded shank and a head; the shrank can be threaded on its whole surface. Certain scrivets in accordance with the present invention consist of said threaded shank and said head. Scrivets are generally inserted through holes. Scrivets are useful for assembling two or more components by an applied force which deforms the plain scrivet end to develop a completed mechanical joint.

Figure 5:
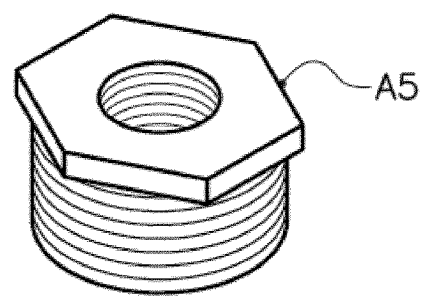
FIG. 5 represents an example of an internally and externally threaded bushing in accordance with the present invention.

The fastener (F) can be a threaded bushing. The bushings in accordance are internally and/or externally threaded, so that they provide fasting functionality in addition to connecting functionality. Preferably, they are internally and externally threaded. An example of an internally and externally threaded bushing in accordance with the present invention is the hex bushing of FIG. 5.

In a special embodiment of the present invention, the fastener (F) is a prevailing-torque fastener, such as a prevailing-torque screw or a prevailing-torque nut. A prevailing-torque fastener can be defined as a threaded fastener which is frictionally resistant to rotation due to a self-contained prevailing-torque feature; in particular, a prevailing-torque screw can be viewed as an externally threaded fastener which is frictionally resistant to rotation due to a self-contained prevailing-torque feature, and not because of a compressive load developed against the underhead bearing surface of the screw or a tensile load developed in the shank of the screw. Certain prevailing-torque fasteners in accordance with the present invention are fasteners made of the polymer material (M), to which have been added an insert of a fused substance other than the polymer material (M), such a lubricant, in their threaded length. Depending on the amount of friction present because of the surface finish and lubricants, the dimensional characteristics of the insert may vary to achieve the performance requirements.

In another embodiment, the fastener (F) can be an unthreaded fastener, i.e. it does not contain threads.

Common types of unthreaded fasteners in accordance with the present invention include pins, retaining rings, rivets, brackets and fastening washers.

The fastener (F) can be a pin. Pins are typically thin, often straight, cylindrical unthreaded fasteners; they are suitable for securing the position of two or more machine parts.

Figure 6:
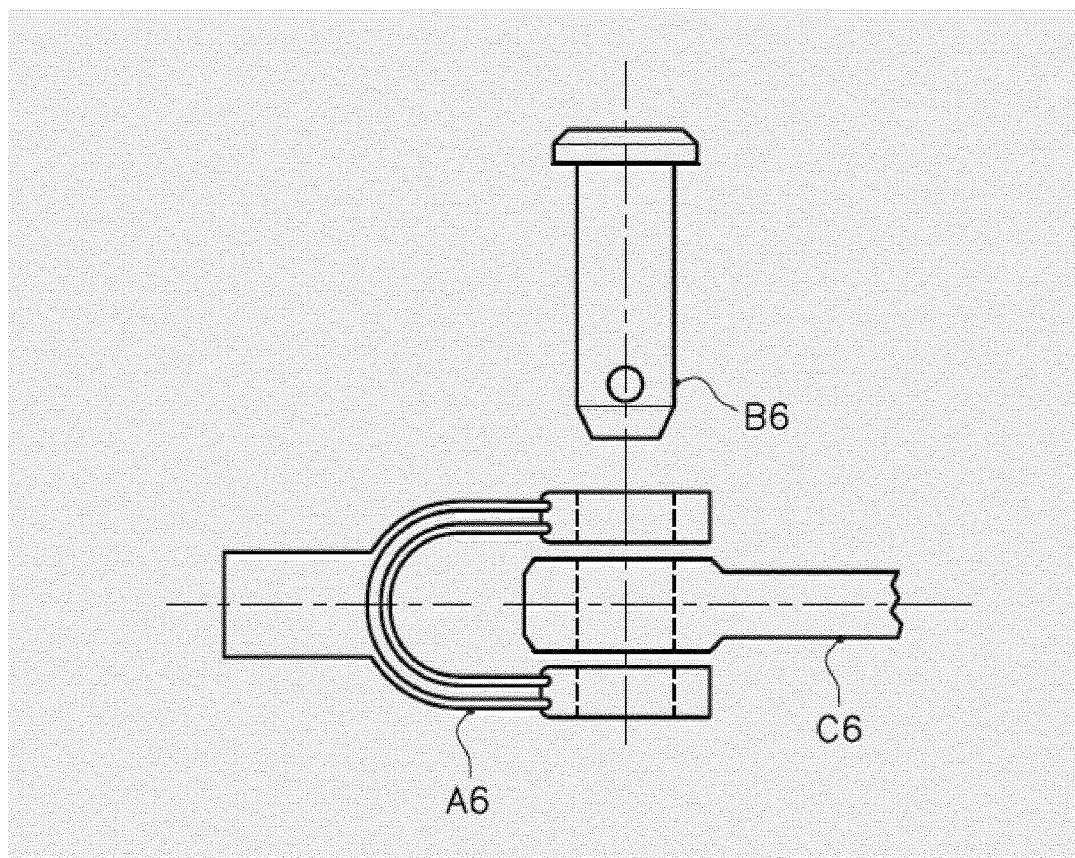
FIG. 6 represents an example of a clevis pin according to the present invention which joins a yoke to a rod end.

Certain pins in accordance with the present invention are clevis pins. Clevis pins are typically fasteners with a head at one end and a hole at the other used to join a clevis to a rod. A clevis is typically a yoke with a hole formed or attached at one end of a rod; FIG. 6 shows an example of a clevis pin according to the present invention which joins a yoke to a rod end. When an eye or hole of a second rod is aligned with the hole in the yoke, a clevis pin can be inserted to join the two. A cotter pin can then be inserted in the hole of the clevis pin to hold it in, yet the fastening is readily detachable. This joint is used for rods in tension where some flexibility is required.

Figure 7:
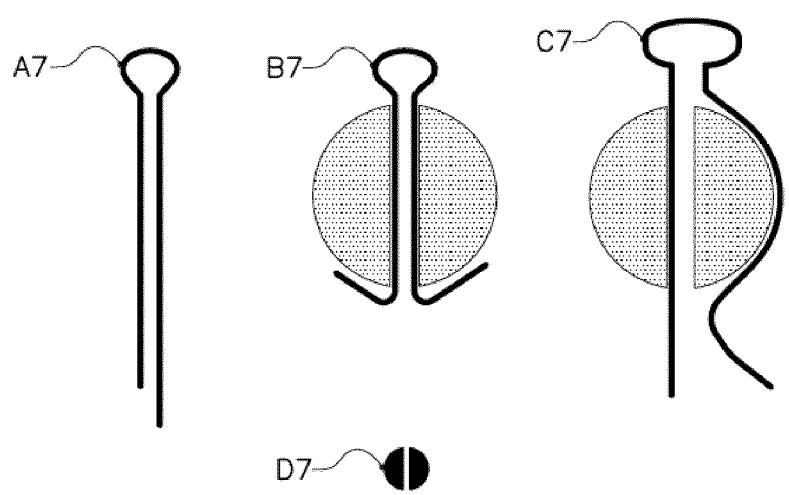
FIG. 7 represents in A: a new cotter pin, B: an installed cotter pin, C: a spring pin, D: a cross-section of a cotter pin (traditional design).

Certain other pins in accordance with the present invention are cotter pins (US terminology). Cotter pins are typically unthreaded fasteners with two tines which can be inserted through a slot for the purpose of holding two pieces together. Cotter pins have traditionally a half-circular cross section. In the United Kingdom, the terms "split pins" are traditionally used to describe the same device. A new cotter pin (see FIG. 7A) has its flat inner surfaces touching for most of its length so that it typically appears to be a split cylinder (FIG. 7D). Once inserted, the two ends of the pin are bent apart, locking it in place (FIG. 7B). In order to facilitate the initial separation of the tines, one tine of the cotter pin is often noticeably longer than the other; and in order to ease insertion into a hole, the longer tine is often slightly curved or beveled to overlap the tip of the shorter tine.

Still other pins in accordance with the present invention are spring pins. Spring pins, as shown in FIG. 7C, also called hitch pins, sometimes known as R-pins from their shape, are also available, which are not designed to be permanently bent. In this design, only one section of the pin passes through the shaft to be secured, the other section being curved to wrap around the outside of the shaft (FIG. 7C).

Figure 8:
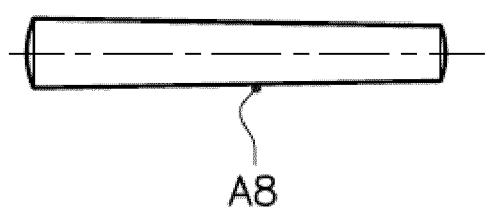
FIG. 8 represents an example of a taper pin in accordance with the present invention.

Still other pins in accordance with the present invention are taper pins. Taper pins are headless, solid pins having controlled diameter, length, and taper, generally with crowned ends. These self-holding pins are useful for connecting parts together. Standard taper pins have a diametral tape of from ¼ in. to 12 in. (0.6 cm to 30 cm) and are driven in holes drilled and reamed to fit. They are sometimes used to connect a hub or collar to a shaft. Taper pins are frequently used to maintain the location of one surface with respect to another. An example of a taper pin design is shown in FIG. 8.

Still other pins in accordance with the present invention are dowel pins. Dowel pins often have typically a sharpened or deformed end. They can be inserted into holes into two adjacent pieces and hold them together. They are useful notably for fastening mortise-and-tenon joints. Dowel pins can be obtained from cutting dowel rods, i.e. solid, cylindrical rods, into short lengths.

Still other pins in accordance with the present invention are straight pins. Straight pins have typically ungrounded, straight cylindrical sides with both ends chamfered.

Still other pins in accordance with the present invention are grooved pins. Grooved pins are pins with grooves; grooved pins often have three grooves equally spaced on the diameter of the pins.

The fastener (F) can be a retaining ring. Retaining rings are typically flat, circular, unthreaded fasteners with a hollow center and an open section. Retaining rings provide typically a shoulder and can be inserted onto a shaft or inside a hole with an internal groove.

The fastener (F) can be a rivet. Rivets are typically non-threaded fasteners that comprise a shank and a head; certain rivets in accordance with the present invention consist of said shank and said head. Rivets are generally inserted through holes. The rivet shank can be formed into a matching head located on the other side of the rivet. Rivets are useful for assembling two or more components by an applied force which deforms the plain rivet end to develop a completed mechanical joint.

The fastener (F) can be a bracket. A bracket can be defined as an angled support for holding objects such as notably a shelf, a lamp or any other object, wherein said angle is typically between 0 and 90 degrees and said support is often attached to a vertical surface such as a wall.

The fastener (F) can be a fastening washer, such as a lock washer. Lock washers are typically washers placed underneath a nut or screw for the purpose of preventing loosening by exerting pressure. Lock washers in accordance with the present invention have advantageously a helical structure, which helps in exerting the pressure. Spring washers are similar to lock washers.

The Polyaryletherketone Polymer

Within the context of the present invention the mention "at least one polyaryletherketone polymer [(PAEK) polymer]" is intended to denote one or more than one (PAEK) polymer. Mixtures of (PAEK) polymer can be advantageously used for the purposes of the invention.

In the rest of the text, the expressions "(PAEK) polymer" are understood, for the purposes of the present invention, both in the plural and the singular, that is to say that the inventive composition may comprise one or more than one (PAEK) polymer.

For the purpose of the invention, the term "polyaryletherketone (PAEK)" is intended to denote any polymer, comprising recurring units, more than 50% moles of said recurring units are recurring units ($R_{PAEK}$) comprising a Ar—C(O)—Ar' group, with Ar and Ar', equal to or different from each other, being aromatic groups. The recurring units ($R_{PAEK}$) are generally selected from the group consisting of formulae (J-A) to (J-O), herein below:

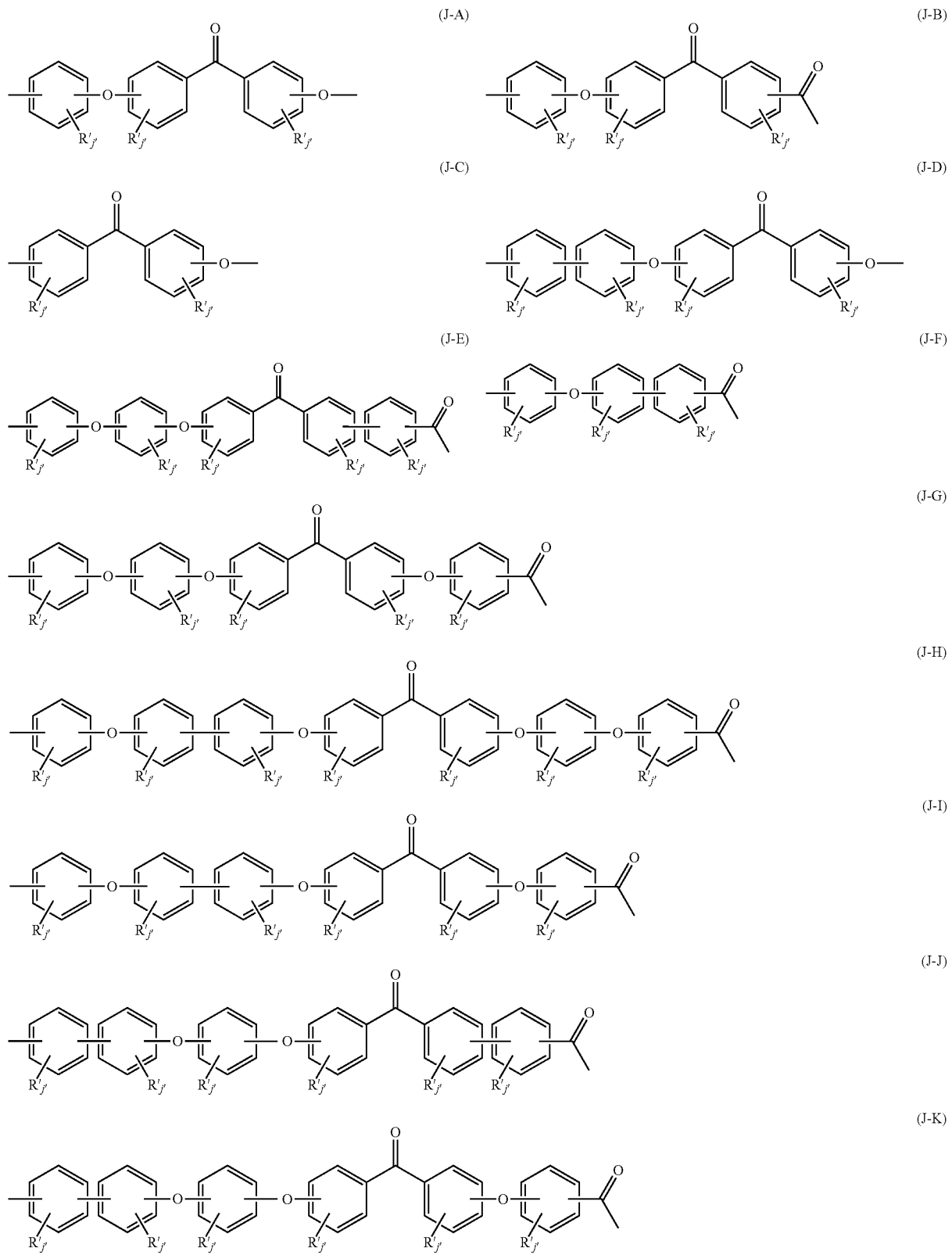

-continued (J-L)
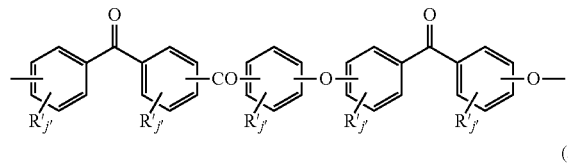

(J-M)
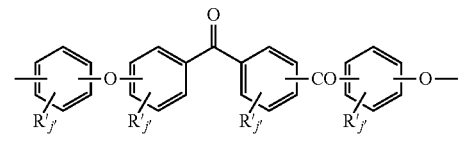

(J-N)
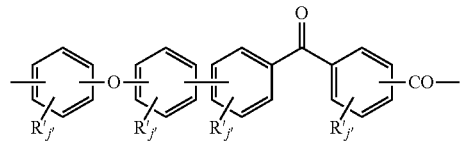

(J-O)
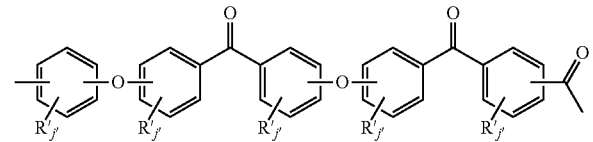

wherein:
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
- j' is zero or is an integer from 0 to 4.

In recurring unit ($R_{PAEK}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK}$), j' is at each occurrence zero, that is to say that the phenylene moieties have no other substituents than those enabling linkage in the main chain of the polymer.

Preferred recurring units ($R_{PAEK}$) are thus selected from those of formulae (J'-A) to (J'-O) herein below:

(J'-A)
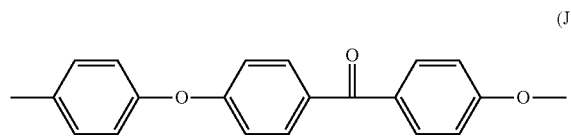

(J'-B)
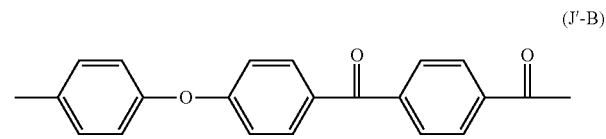

(J'-C)
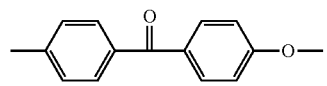

(J'-D)
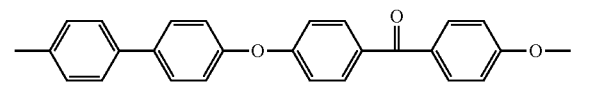

(J'-E)
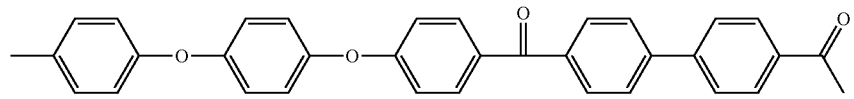

(J'-F)
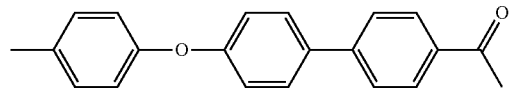

(J'-G)
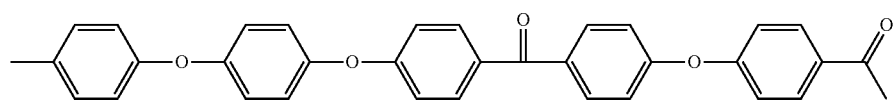

(J'-H)
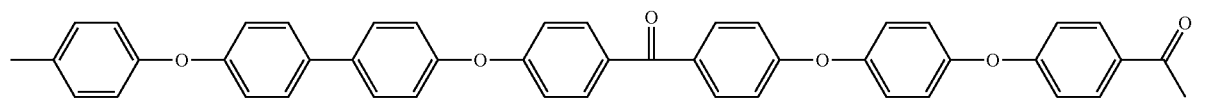

(J'-I)
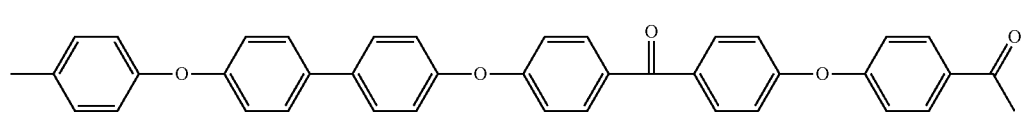

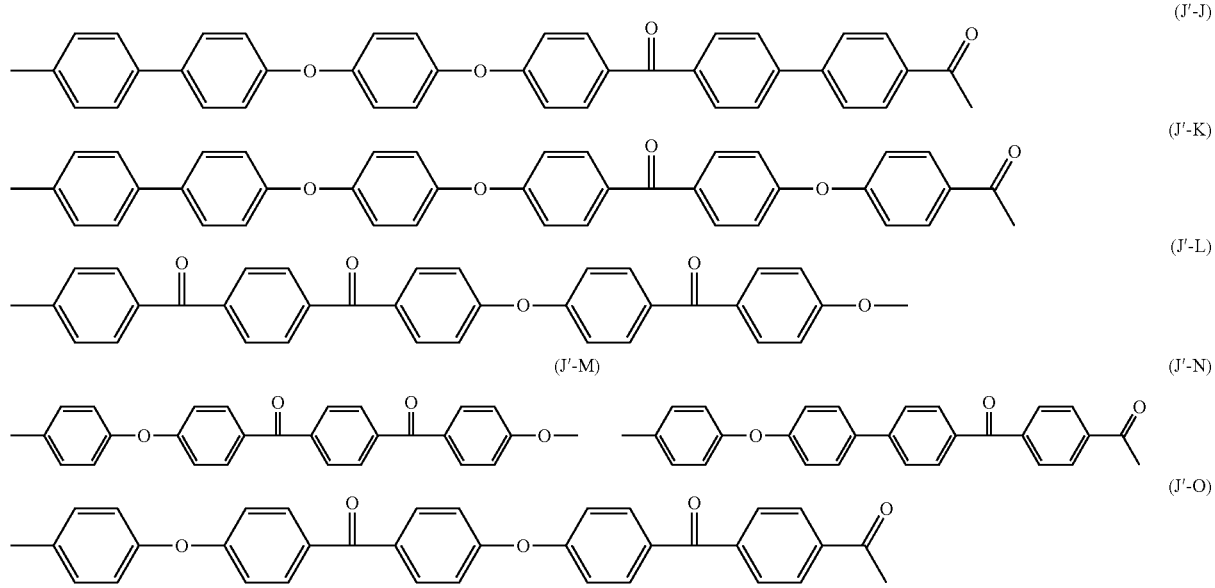

In the (PAEK) polymer, as detailed above, preferably more than 60%, more preferably more than 80%, still more preferably more than 90% moles of the recurring units are recurring units ($R_{PAEK}$), as above detailed.

Still, it is generally preferred that substantially all recurring units of the (PAEK) polymer are recurring units ($R_{PAEK}$), as detailed above; chain defects, or very minor amounts of other units might be present, being understood that these latter do not substantially modify the properties of ($R_{PAEK}$).

The (PAEK) polymer may be notably a homopolymer, a random, alternate or block copolymer. When the (PAEK) polymer is a copolymer, it may notably contain (i) recurring units ($R_{PAEK}$) of at least two different formulae chosen from formulae (J-A) to (J-O), or (ii) recurring units ($R_{PAEK}$) of one or more formulae (J-A) to (J-O) and recurring units ($R*_{PAEK}$) different from recurring units ($R_{PAEK}$).

As will be detailed later on, the (PAEK) polymer may be a polyetheretherketone polymer [(PEEK) polymers, herein after]. Alternatively, the (PAEK) polymer may be a polyetherketoneketone polymer [(PEKK) polymer, herein after], a polyetherketone polymer [(PEK) polymer, hereinafter], a polyetheretherketoneketone polymer [(PEEKK) polymer, herein after], or a polyetherketoneetherketoneketone polymer [(PEKEKK) polymer, herein after].

The (PAEK) polymer may also be a blend composed of at least two different (PAEK) polymers chosen from the group consisting of (PEKK) polymers, (PEEK) polymers, (PEK) polymers and (PEEKK) polymers, as above detailed.

For the purpose of the present invention, the term "(PEEK) polymer" is intended to denote any polymer of which more than 50% by moles of the recurring units are recurring units ($R_{PAEK}$) of formula J'-A.

Preferably more than 75% by moles, preferably more than 85% by moles, preferably more than 95% by moles, preferably more than 99% by moles of the recurring units of the (PEEK) polymer are recurring units of formula J'-A. Most preferably all the recurring units of the (PEEK) polymer are recurring units of formula J'-A.

For the purpose of the present invention, the term "(PEKK) polymer" is intended to denote any polymer of which more than 50% by moles of the recurring units are recurring units ($R_{PAEK}$) of formula J'-B.

Preferably more than 75% by moles, preferably more than 85% by moles, preferably more than 95% by moles, preferably more than 99% by moles of the recurring units of the (PEKK) polymer are recurring units of formula J'-B. Most preferably all the recurring units of the (PEKK) polymer are recurring units of formula J'-B.

For the purpose of the present invention, the term "(PEK) polymer" is intended to denote any polymer of which more than 50% by moles of the recurring units are recurring units ($R_{PAEK}$) of formula J'-C.

Preferably more than 75% by moles, preferably more than 85% by moles, preferably more than 95% by moles, preferably more than 99% by moles of the recurring units of the (PEK) polymer are recurring units of formula J'-C. Most preferably all the recurring units of the (PEK) polymer are recurring units of formula J'-C.

For the purpose of the present invention, the term "(PEEKK) polymer" is intended to denote any polymer of which more than 50% by moles of the recurring units are recurring units ($R_{PAEK}$) of formula J'-M.

Preferably more than 75% by moles, preferably more than 85% by moles, preferably more than 95% by moles, preferably more than 99% by moles of the recurring units of the (PEEKK) polymer are recurring units of formula J'-M. Most preferably all the recurring units of the (PEEKK) polymer are recurring units of formula J'-M.

For the purpose of the present invention, the term "(PEKEKK) polymer" is intended to denote any polymer of which more than 50% by moles of the recurring units are recurring units ($R_{PAEK}$) of formula J'-L.

Preferably more than 75% by moles, preferably more than 85% by moles, preferably more than 95% by moles, preferably more than 99% by moles of the recurring units of the (PEKEKK) polymer are recurring units of formula J'-L. Most preferably all the recurring units of the (PEKEKK) polymer are recurring units of formula J'-L.

Excellent results were obtained when the (PAEK) polymer was a (PEEK) homopolymer, i.e. a polymer of which substantially all the recurring units of the (PEEK) polymer are recurring units of formula J'-A, wherein chain defects, or very minor amounts of other units might be present, being understood that these latter do not substantially modify the properties of the (PEEK) homopolymer.

Non limitative examples of commercially available polyaryletherketone (PAEK) resins suitable for the invention include the KETASPIRE® polyetheretherketone commercially available from Solvay Specialty Polymers USA, LLC.

The (PAEK) polymer can have a intrinsic viscosity (IV) of at least 0.50 dl/g, preferably at least 0.60 dl/g, more preferably at least 0.70 dl/g, as measured in 95-98% sulfuric acid (d=1.84 g/ml) at a (PAEK) polymer concentration of 0.1 g/100 ml.

The IV of the (PAEK) polymer can notably be equal to or less than 1.40 dl/g, preferably equal to or less than 1.30 dl/g, more preferably equal to or less than 1.20 dl/g, most preferably equal to or less than 1.15 dl/g, as measured in 95-98% sulfuric acid (d=1.84 g/ml) at a (PAEK) polymer concentration of 0.1 g/100 ml.

Good results have been obtained with (PAEK) polymers having an IV from 0.70 dl/g to 1.15 dl/g, as measured in 95-98% sulfuric acid (d=1.84 g/ml) at a (PAEK) polymer concentration of 0.1 g/100 ml.

The measurement is generally performed using a No 50 Cannon-Fleske viscometer; IV is measured at 25° C. in a time less than 4 hours after dissolution.

The (PAEK) polymer has a melt viscosity of advantageously at least 0.05 kPa·s, preferably at least 0.08 kPa·s, more preferably at least 0.1 kPa·s, still more preferably at least 0.12 kPa·s at 400° C. and a shear rate of 1000 $s^{-1}$, as measured using a capillary rheometer in accordance with ASTM D3835.

As capillary rheometer, a Kayeness Galaxy V Rheometer (Model 8052 DM) can be used.

The PAEK polymer has a melt viscosity of advantageously at most 1.00 kPa·s, preferably at most 0.80 kPa·s, more preferably at most 0.70 kPa·s, even more preferably at most 0.60 kPa·s, most preferably at most 0.50 kPa·s at 400° C. and a shear rate of 1000 $s^{-1}$, as measured using a capillary rheometer in accordance with ASTM D3835.

The (PAEK) polymer can be prepared by any method known in the art for the manufacture of poly(aryl ether ketone)s.

The Nitride (NI)

Within the context of the present invention the mention "at least one nitride (NI)" is intended to denote one or more than one nitride (NI). Mixtures of nitrides (NI) can be advantageously used for the purposes of the invention.

For the purpose of the present invention, an "element" is intended to denote an element from the Periodic Table of the Elements.

The value of the electronegativity of an element that are to be taken into consideration for the purpose of the present invention are those reported in the Periodic Table of the Elements edited by J. Breysem, do VEL s.a., "Produits, appareillage et fournitures pour le laboratoire", printed in Belgium in February 1987.

Non limitative examples of nitrides (NI) of an element having an electronegativity ($\epsilon$) of from 1.3 to 2.5 are listed <<Handbook of Chemistry and Physics>>, CRC Press, $64^{th}$ edition, pages B-65 to B-158. The code into brackets is the one attributed by the CRC Handbook to the concerned nitride, while $\epsilon$ denotes the electronegativity of the element from which the nitride is derived. Then, nitrides (NI) of an element having an electronegativity ($\epsilon$) of from 1.3 to 2.5 suitable to the purpose of the present invention are notably aluminum nitride (AlN, a45, $\epsilon$=1.5), antimony nitride (SbN, a271, $\epsilon$=1.9), beryllium nitride ($Be_3N_2$, b123, $\epsilon$=1.5), boron nitride (BN, b203, $\epsilon$=2.0), chromium nitride (CrN, c406, $\epsilon$=1.6), copper nitride ($Cu_3N$, c615, $\epsilon$=1.9), gallium nitride (GaN, g41, $\epsilon$=1.6), trigermanium dinitride ($Ge_3N_2$, g82, $\epsilon$=1.8), trigermanium tetranitride ($Ge_3N_4$, g83, $\epsilon$=1.8), hafnium nitride (HfN, h7, $\epsilon$=1.3), iron nitrides like $Fe_4N$ (i151, $\epsilon$=1.8) and $Fe_2N$ or $Fe_4N_2$ (i152, $\epsilon$=1.8), mercury nitride ($Hg_3N_2$, m221, $\epsilon$=1.9), niobium nitride (n109, $\epsilon$=1.6), silicium nitride ($Si_3N_4$, s109, $\epsilon$=1.8), tantalum nitride (TaN, t7, $\epsilon$=1.5), titanium nitride ($Ti_3N_4$, t249, $\epsilon$=1.5), wolfram dinitride ($WN_2$, t278, $\epsilon$=1.7), vanadium nitride (VN, v15, $\epsilon$=1.6), zinc nitride ($Zn_3N_2$, z50, $\epsilon$=1.6) and zirconium nitride (ZrN, z105, $\epsilon$=1.4).

The nitride (NI) is a nitride of an element having an electronegativity of preferably at least 1.6, and more preferably at least 1.8. In addition, the nitride (NI) is the nitride of an element having an electronegativity of preferably at most 2.2.

Besides, the nitride (NI) is chosen preferably from nitrides of an element chosen from Groups IIIa, IVa, IVb, Va, Vb, VIa, VIb, VIIb and VIII of the Periodic Table of the Elements, and more preferably from nitrides of an element of Group IIIa of the Periodic Table of the Elements.

The most preferred nitride (NI) is boron nitride.

The Applicant has surprisingly found that the presence of the nitride (NI), as described above, is effective in enhancing the stiffness of the composition (C) while maintaining the ductility of an unfilled PAEK polymer, thereby offering said composition (C) of the invention superior properties which allows them to be very useful as being comprised in fasteners.

The Applicant has found that the average particle size of the nitride (NI) may play a role in improving mechanical properties such as in particular the stiffness and the tensile elongation at break of the composition (C) and in improving the aesthetics aspects, especially in improved the color of the composition (C).

The average particle size of the nitride (NI) is advantageously equal to or below 30 μm, preferably equal to or below 20 μm, more preferably equal to or below 18 μm, more preferably equal to or below 10 μm.

The average particle size of the nitride (NI) is preferably equal to or at least 0.05 μm, equal to or at least 0.1 μm, more preferably equal to or at least 0.2 μm, equal to or at least 1 μm.

The average particle size of the nitride (NI) is preferably from 1 μm to 20 μm, more preferably from 2 μm to 18 μm, more preferably from 2 μm to 10 μm.

An average particle size of the nitride (NI) of about 2.5 μm gave particularly good results.

The average particle size of the nitride (NI) is measured via light scattering techniques (dynamic or laser) using the respective equipment coming for example from the company Malvern (Mastersizer Micro or 3000) or using screen analysis according to DIN 53196.

Composition (C)

The composition (C) of the present invention advantageously comprises the nitride (NI) in an amount of at least 1.0% wt, preferably at least 1.10% wt, more preferably at least 2.0% wt, most preferably at least 5.0% wt based on the total weight of the composition (C).

As such, there is no upper limit on the amount of the nitride (NI) present in the composition (C) of the present invention.

In one embodiment, the composition (C) of the present invention advantageously comprises the nitride (NI) in an amount of at most 50.0% wt, preferably at most 40.0% wt, more preferably at most 30.0% wt, even more preferably at most 20.0% wt, still more preferably at most 15.0% wt, and most preferably at most 10.0% wt, based on the total weight of the composition (C).

The composition (C) of the present invention advantageously comprises the nitride (NI) in an amount ranging from 2 to 50% wt, more preferably from 5 to 20% wt, even more preferably from 5 to 10% wt, based on the total weight of the composition (C).

The total weight of the (PAEK) polymer, based on the total weight of the composition (C), is advantageously above 50%, preferably above 60%; more preferably above 70%; more preferably above 80%, more preferably above 85%.

If desired, the composition (C) consists of the (PAEK) polymer and the nitride (NI).

A preferred composition (C) of the invention thus includes a (PAEK) polymer, as above detailed, and more preferably a (PAEK) polymer comprising recurring units ($R_{PAEK}$) of formula (J'-A), as above detailed and boron nitride in an amount of 5 to 15% wt, based on the total weight of the composition (C).

The composition (C) of the present invention may further comprise at least one other thermoplastic polymer (polymer T).

Non limitative examples of polymers (T) suitable for use in composition (C) of the present invention, include for example polyarylethersulfones, polyphenylenes, polyimides, more notably polyetherimides, and polyphenylene sulfides.

The weight of said other polymers is advantageously below 40% wt, preferably below 30% wt, and more preferably below 25% wt based on the total weight of the composition (C).

The composition (C) can further comprise one or more ingredients other than the (PAEK) polymer [ingredient (I), herein after].

Non limitative examples of ingredient (I) suitable for use in composition (C) of the present invention, are polymeric compositions, additives such as UV absorbers; stabilizers such as light stabilizers and heat stabilizers; antioxidants; lubricants; processing aids; plasticizers; flow modifiers; flame retardants; pigments such as notably titanium dioxide ($TiO_2$); dyes; colorants; anti-static agents; extenders; metal deactivators; conductivity additive such as carbon black and carbon nanofibrils and combinations comprising one or more of the foregoing additives.

The weight of said ingredient (I) is advantageously below 10% wt and preferably below 5% wt, based on the total weight of the composition (C).

If desired, the composition (C) comprises more than 80 wt % of the (PAEK) polymer with the proviso that the (PAEK) polymer is the only polymeric components in the composition (C) and one or more optional ingredient such as notably UV absorbers; stabilizers such as light stabilizers and heat stabilizers; antioxidants; lubricants; processing aids; plasticizers; flow modifiers; flame retardants; pigments such as notably titanium dioxide ($TiO_2$); dyes; colorants; anti-static agents; extenders; metal deactivators; conductivity additive such as carbon black and carbon nanofibrils might be present therein, without these components dramatically affecting relevant mechanical and toughness properties of the composition (C).

The expression 'polymeric components' is to be understood according to its usual meaning, i.e. encompassing compounds characterized by repeated linked units, having typically a molecular weight of 2000 or more.

The polymer composition (C) may further comprise at least one reinforcing filler. Reinforcing fillers are well known by the skilled in the art. They are preferably selected from fibrous and particulate fillers different from the pigment as defined above. More preferably, the reinforcing filler is selected from mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite etc. Still more preferably, it is selected from mica, kaolin, calcium silicate, magnesium carbonate, glass fiber, carbon fibers and wollastonite etc.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition (C) may have a circular cross-section or a non-circular cross-section (such as an oval or rectangular cross-section).

When the glass fibers used have a circular cross-section, they preferably have an average diameter of 3 to 30 μm and particularly preferred of 5 to 12 μm. Different sorts of glass fibers with a circular cross-section are available on the market depending on the type of the glass they are made of. One may notably cite glass fibers made from E- or S-glass.

Good results were obtained with standard E-glass material with a non-circular cross section. Excellent results were obtained when the polymer composition with S-glass fibers with a round cross-section and, in particular, when using round cross-section with a 6 μm diameter (E-Glass or S-glass).

In another embodiment of the present invention the reinforcing filler is a carbon fiber.

As used herein, the term "carbon fiber" is intended to include graphitized, partially graphitized and ungraphitized carbon reinforcing fibers or a mixture thereof. Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers useful for the present invention are preferably chosen from the group composed of PAN-based carbon fibers, pitch based carbon fibers, graphite fibers, and mixtures thereof.

The weight of said reinforcing filler is advantageously preferably below 60% wt, more preferably below 50% wt, even more preferably below 45% wt, most preferably below 35% wt, based on the total weight of the composition (C).

Preferably, the reinforcing filler is present in an amount ranging from 10 to 60% wt, preferably from 20 to 50% wt, preferably from 25 to 45% wt, most preferably from 25 to 35% wt, based on the total weight of the polymer composition (C).

The composition (C) can be prepared by a variety of methods involving intimate admixing of the polymer materials with any optional ingredient, as detailed above, desired in the formulation, for example by melt mixing or a combination of dry blending and melt mixing. Typically, the dry blending of the (PAEK) polymer and the nitride (NI), and optionally the polymers (T), optionally the reinforcing filler and optionally ingredient (I), as above details, is carried out by using high intensity mixers, such as notably Henschel-type mixers and ribbon mixers.

So obtained powder mixture can comprise the (PAEK) polymer and the nitride (NI), and optionally the polymers (T), optionally the reinforcing filler and optionally ingredient (I), in the weight ratios as above detailed, suitable for obtaining effective formation of the above described fasteners, or can be a concentrated mixture to be used as masterbatch and diluted in further amounts of the (PAEK) polymer and the nitride (NI), and optionally the polymers (T), optionally the reinforcing filler and optionally ingredient (I) in subsequent processing steps.

It is also possible to manufacture the composition of the invention by further melt compounding the powder mixture as above described. As said, melt compounding can be effected on the powder mixture as above detailed, or preferably directly on the (PAEK) polymer and the nitride (NI), and optionally the polymers (T), optionally the reinforcing filler and optionally ingredient (I). Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the powder mixture or the ingredients as above detailed and advantageously obtain a homogeneous distribution of the different ingredients. Provided that optimum mixing is achieved between the bulk polymer and filler contents. It is advantageously possible to obtain strand extrudates which are not ductile of the composition (C) of the invention. Such strand extrudates can be chopped by means e.g. of a rotating cutting knife after some cooling time on a conveyer with water spray. Thus, for example composition (C) which may be present in the form of pellets or beads can then be further used for the manufacture of the above described fastener.

Another objective of the present invention is to provide a method for the manufacture of the fastener. Such method is not specifically limited. The polymer composition (C) may be generally processed by injection molding, extrusion or other shaping technologies.

In one embodiment of the present invention, the method for the manufacture of the above described fastener includes the step of injection molding and solidification of the polymer composition (C).

In another embodiment of the present invention, the method for the manufacture of the above described fastener includes the machining of a standard shaped structural part in a part having any type of size and shape. Non limiting examples of said standard shaped structural part include notably a plate, a rod, a slab and the like. Said standard shaped structural parts can be obtained by extrusion or injection molding of the polymer composition (C).

The Applicant has found unexpectedly that the composition (C) of the present invention is effective in providing fasteners having a combination of stiffness and elongation at break and impact resistance previously not known in the PAEK compositional art. It is this rare combination of properties that make the compositions of the present invention surprising and of great utility for aerospace fastener applications.

The Applicant has also found that said fasteners comprising the composition (C) of the present invention have improved aesthetics, in particular improved lighter color and said fasteners have a higher acceptance for many applications where color is a concern.

The fasteners of the present invention have advantageously the following color characteristics:
Color $L^*>70$, preferably $L^*>71$;
Color $b^*$ is at least 8
where the color was measured on injection moulded color plaques that are 2.5 mm in thickness using the CIE Lab standards, as follows. The color is generally characterized by $L^*$, $a^*$, $b^*$ values, which are tristimulus coordinates defined by the CIE (Commission Internationale de l'Eclairage) in 1976 (K. Nassau, in "Kirk-Othmer Encylopedia of Chemical Technology", 2004, Chapter 7, P 303-341). These three basic coordinates represent the lightness of the color ($L^*$, $L^*=0$ yields black and $L^*=100$ indicates white), its position between red/magenta and green ($a^*$, negative values indicate green while positive values indicate magenta) and its position between yellow and blue ($b^*$, negative values indicate blue and positive values indicate yellow).

The fastener (F) can find utility as such or as a component of a multitude of devices, such as ball lock pins, latches, clips, clip nuts, plug and sleeve, floating nut fasteners, isolator mounts, nut plates, split joint fittings, floor fittings, quarter turn fasteners, inserts, support brackets, mounting brackets, latches, release pins, hinges, bolt bushings, cable ties, tubing hangers, wiring clamps, standoffs, spacers, conduit brackets, etc.

The fastener (F) is particularly useful for demanding applications. For example, it is particularly well suited for aircrafts and other self-propelled vehicles applications where lightness, torque, strength, toughness and resistance to thermal degradation are key properties.

The fastener (F) can be included notably in aircraft partitions, aircraft sidewalls, aircraft floorings, aircraft ceiling panels, aircraft passenger service units, aircraft infill panels, aircraft lighting sidewall and ceiling, aircraft video monitors, aircraft stow bins, aircraft oxygen boxes, aircraft HVAC ducting, aircraft food trays, aircraft arm rests, aircraft seat structures, aircraft sidewalls of lavatories, of galleys and catering trolleys, aircraft flight deck instrumentations, aircraft wire and cable harnessings and clampings, and aircraft power generation and distribution systems.

More generally, the fastener (F) will be useful in any industrial application wherein chemical resistance, mechanical resistance, light weight, corrosion resistance and/or electrical insulation are important, such as the semicon industry.

Should the disclosure of any patents, patent applications, and publications which are incorporated herein by reference conflict with the description of the present application to the extent that it may render a term unclear, the present description shall take precedence.

The invention will be now described in more details with reference to the following examples, whose purpose is merely illustrative and not intended to limit the scope of the invention.

Raw Materials

KetaSpire® PEEK KT-820P is polyetheretherketone polymer commercially available from Solvay Specialty Polymers USA, LLC.

Boron Nitride, Boronid® S1-SF commercially available from ESK Ceramics, GmbH, average particle size of 2.5 µm.
Boron Nitride, Boronid® S15 commercially available from ESK Ceramics, GmbH, average particle size of 15 µm.
Carbon Fiber, Sigrafil C30 APS 006 from SGL Corporation
Talc, Mistron Vapor R, commercially available from Luzenac America General Description of the Compounding Process of PEEK Resins A dry blend of PEEK resins with the desired amounts of Boronid® S1-SF or Boronid® S15 were prepared by first tumble blending for about 20 minutes, followed by melt compounding using an 25 mm Berstorff co-rotating partially intermeshing twin screw extruder having an L/D ratio of 40:1. The extruder had 8 barrel sections with barrel sections 2 through 8 being heated sections. Vacuum venting was applied at barrel section 7 with 18-20 in of vacuum during compounding to strip off moisture and any possible residual volatiles from the compound. The compounding temperature profile was such that barrel sections 2-5 were set at 330° C. while barrel sections 5-8 and the die adapter were set at 340° C. The screw speed used 180 throughout and the throughput rate was 15-17 lb/hr, whereas the melt temperature, measured manually for each formulation molten extrudate, at the exit of the extruder die ranged from 398 to 402° C. The extrudate for each formulation was cooled in a water trough and then pelletized using a pelletizer. The thus obtained pellets of the four blends were next dried for 4 hours in a desiccated air oven at 150° C. and subjected to mechanical testing. Said pellets were injection-molded to produce ASTM test specimens using a Toshiba 150 ton injection molding machine following standard conditions and guidelines for KetaSpire KT-820 PEEK resin provided by the supplier Solvay Specialty Polymers.

Mechanical properties were tested for all the formulations using injection molded 0.125 inch thick ASTM test specimens which consisted of 1) Type I tensile bars, 2) 5 in×0.5 in×0.125 in flexural bars, and 3) 4 in×4 in×0.125 in plaques for the instrumented impact (Dynatup) testing.

The following ASTM test methods were employed in evaluating all nine compositions:
  D638: Tensile properties using a test speed of 2 in/min
  D790: Flexural properties
  D256: Izod impact resistance (notched)
  D4812: Izod impact resistance (unnotched)
  D3763: Instrumented impact resistance also known by the name Dynatup impact
  D648: Heat deflection temperature (HDT)
  D5279: DMA Storage Modulus at 200° C. (Pa)

HDT was measured at an applied stress of 264 psi and using 0.125 in-thick flexural specimens annealed at 200° C. for 2 hours to assure uniform crystallinity and removal of residual molded-in stresses in the parts which can otherwise compromise the accuracy of the measurement.

The color of 4 in×4 in×0.125 injection molded plaques injection molded color plaques was measured according to ASTM E308-06 using illuminant D65 (white light simulating daylight) at 10° angle (1964 CIE).

L*, a* and b* color coordinates were measured using a Gretag Macbeth Color Eye Ci5 Spectrophotometer, with tribeam diffuse/8 "6" sphere optical geometry, a bandpass of 10 nm, a spectral range of 360 nm to 750 nm per CIE Lab standards using illuminant D65 and a 10 degree observer. Thus, the L, a and b color coordinates measured by this test correspond to the lightness scale (L), green-red hue scale (a) and the blue-yellow hue scale (b).

Composition, mechanical properties, color properties and physical properties of the nine compositions are summarized in Table 1.

TABLE 1

| | Comp. example 1 (C1) | 2 | 3 | 4 | 5 | 6 | 7 | 8 | 9 |
|---|---|---|---|---|---|---|---|---|---|
| KetaSpire KT-820P PEEK (wt %) | 100.0 | 99.5 | 98.8 | 97.5 | 95.0 | 92.5 | 90.0 | 95.0 | 90.0 |
| Boron Nitride, Boronid ® S1-SF (wt %) | — | 0.5 | 1.2 | 2.5 | 5.0 | 7.5 | 10.0 | | |
| Boron Nitride, Boronid ® S15 (wt %) | | | | | | | | 5.0 | 10.0 |
| Mechanical properties | | | | | | | | | |
| Tensile Yield Strength (psi) | 13555 | 13600 | 13700 | 13715 | 13610 | 13630 | 13640 | 13550 | 13600 |
| Tensile Modulus (Ksi) | 536 | 558 | 580 | 611 | 679 | 759 | 839 | 675 | 830 |
| Tensile Yield Elongation (%) | 5.1 | 5.0 | 4.9 | 5.0 | 4.9 | 4.80 | 4.7 | 4.9 | 4.7 |
| Tensile Elongation at Break (%) | 24 | 35 | 31 | 33 | 40 | 46 | 41 | 23 | 23 |
| Flexural Strength (psi) | 20675 | 21000 | 21300 | 21675 | 21320 | 22310 | 22860 | | |
| Flexural Modulus (Ksi) | 532 | 558 | 573 | 601 | 625 | 710 | 775 | | |
| Notched Izod (ft-lb/in) | 1.77 | 1.51 | 1.45 | 1.77 | 2.15 | 2.12 | 2.07 | 1.83 | 1.79 |
| No Notch Izod (ft-lb/in) | NB | NB | NB | NB | NB | NB | NB | NB | NB |
| Dynatup - Total Energy (ft-lb) | 52.0 | 57.7 | 55.6 | 53.5 | 51.5 | 53.7 | 50.6 | 51.0 | 38.4 |
| Dynatup - Max. Load (lb) | 1426 | — | — | 1499 | 1513 | 1547 | 1640 | 1627 | 1478 |
| Dynatup - Energy at Max Load (ft-lb) | 39.0 | — | — | 41.1 | 40.1 | 42.8 | 44.0 | 45.0 | 36.0 |
| Dynatup - Max. Deflection (in) | 0.64 | — | — | 0.64 | 0.62 | 0.64 | 0.62 | 0.64 | 0.56 |
| Color properties | | | | | | | | | |
| CIE Lab L* Color Value | 65.2 | 68.9 | 71.1 | 73.0 | 76.1 | 78.3 | 79.6 | 70.5 | 73.3 |
| CIE Lab a* Color Value | 1.76 | 1.74 | 1.40 | 1.38 | 1.27 | 1.11 | 0.98 | 1.82 | 1.52 |
| CIE Lab b* Color Value | 7.07 | 7.45 | 8.58 | 9.95 | 10.76 | 11.02 | 11.15 | 11.13 | 12.09 |

TABLE 1-continued

| | Comp. example 1 (C1) | 2 | 3 | 4 | 5 | 6 | 7 | 8 | 9 |
|---|---|---|---|---|---|---|---|---|---|
| Physical properties | | | | | | | | | |
| DMA Storage Modulus at 200° C. (Pa) | 1.30E8 | — | — | 1.80E8 | 2.11E8 | 2.65E8 | 1.81E8 | 2.46E8 | 1.80E8 |
| HDT [Annealed 200° C./2 h] (° C.) | 158° C. | — | — | 162° C. | 163° C. | 165° C. | 161° C. | 167° C. | 162° C. |

NB = No break

General Description of the Compounding Process of Carbon Fiber Reinforced PEEK Resins Carbon fiber-reinforced PEEK formulations described in Table 2 were prepared by melt compounding using a twin screw co-rotating intermeshing extruder equipped with 8 barrel sections and an overall L/D ratio of 40. The PEEK powder was tumble blended with either the boron nitride or fed as is (in the case of the Control) in the feed hopper of the extruder. The carbon fiber was fed gravimetrically at the required proportion and was metered at a feed port on barrel section 5 of the extruder. A vacuum vent port at barrel section 7 was used to pull high vacuum on the melt to remove any residual moisture or organic volatiles that may evolve from the sizing of the carbon fiber. The compounded formulations were stranded using a one-hole 3 mm diameter and were cooled on a conveyor belt with a water spray before being fed to a pelletizer to chop the extrudate into pellets. Details of the compounding conditions are shown in Table 3.

TABLE 2

Properties of carbon fiber reinforced PEEK modified with talc and with boron nitride

| | Comparative Example 10 (C10) | 11 | Comparative Example 12 (C12) |
|---|---|---|---|
| KetaSpire KT-820P PEEK | 70.0 | 68.6 | 68.6 |
| Boron Nitride, Boronid ® S1-SF | — | 2.0 | — |
| Talc, Mistron Vapor 12 | — | — | 2.0 |
| Carbon Fiber, SGL C30 APS 006 | 30.0 | 29.4 | 29.4 |
| Mechanical properties | | | |
| Tensile Strength (psi) @0.2"/min | 32050 | 31410 | 30920 |
| Tensile Modulus (Ksi) | 3413 | 3470 | 3407 |
| Tensile Elongation at Break (%) | 2.17 | 2.32 | 2.24 |
| Flex Strength (psi) | 50290 | 49310 | 48970 |
| Flex Modulus (Ksi) | 2684 | 2729 | 2689 |
| Flex Strain at Break (%) | 2.58 | 2.61 | 2.56 |
| Notched Izod (ft-lb/in) | 1.76 | 1.63 | 1.55 |
| No Notch Izod (ft-lb/in) | 15.5 | 16.1 | 15.9 |

TABLE 3

Compounding conditions and process parameters used to make formulations listed in Table 3.

| | Comparative Example 10 (C10) | 11 | Comparative Example 12 (C12) |
|---|---|---|---|
| Barrel Zone Temperatures (° C.) | | | |
| Barrel Section 1 | No Heat | No Heat | No Heat |
| Barrel Section 2 (Set Point/Actual) | 330/329 | 330/330 | 330/329 |
| Barrel Section 3 (Set Point/Actual) | 330/330 | 330/330 | 330/330 |
| Barrel Section 4 (Set Point/Actual) | 330/331 | 330/330 | 330/331 |
| Barrel Section 5 (Set Point/Actual) | 330/334 | 330/332 | 330/332 |
| Barrel Section 6 (Set Point/Actual) | 340/343 | 340/342 | 340/341 |
| Barrel Section 7 (Set Point/Actual) | 340/342 | 340/342 | 340/340 |
| Barrel Section 8 (Set Point/Actual) | 340/340 | 340/342 | 340/341 |
| Adapter (Set Point/Actual) | 340/340 | 340/341 | 340/341 |
| Die (Set Point/Actual) | 340/340 | 340/341 | 340/341 |
| Actual Melt Temperature (° C.) | 402 | 407 | 423 |
| Screw Speed (rpm) | 230 | 230 | 235 |
| Vent Vacuum on BBL Section 7 (in Hg) | 29 | 29 | 29 |
| Feed Rate, Main (lb/hr) | 7.0 | 7.06 | 7.06 |

TABLE 3-continued

Compounding conditions and process parameters used to make formulations listed in Table 3.

| | Examples | | |
|---|---|---|---|
| | Comparative Example 10 (C10) | 11 | Comparative Example 12 (C12) |
| Feed Rate, Carbon Fiber (lb/hr) | 3.0 | 2.94 | 2.94 |
| Feed Rate, Total (lb/hr) | 10.0 | 10.0 | 10.0 |

The invention claimed is:

1. A fastener comprising a polymer composition (C) comprising:
   (i) at least one polyaryletherketone polymer, (PAEK) polymer; and
   (ii) at least one nitride (NI) of an element having an electronegativity ($\epsilon$) of from 1.3 to 2.5, as defined in <<Handbook of Chemistry and Physics>>, CRC Press, $64^{th}$ edition, pages B-65 to B-158,
   wherein the fastener is selected from the group consisting of a threaded fastener, a bolt, a nut, a pin, a rivet, a bracket, and a lock washer.

2. The fastener according to claim 1, wherein more than 50% moles of recurring units of the (PAEK) polymer are recurring units ($R_{PAEK}$) selected from those of formulae (J-A) to (J-O):

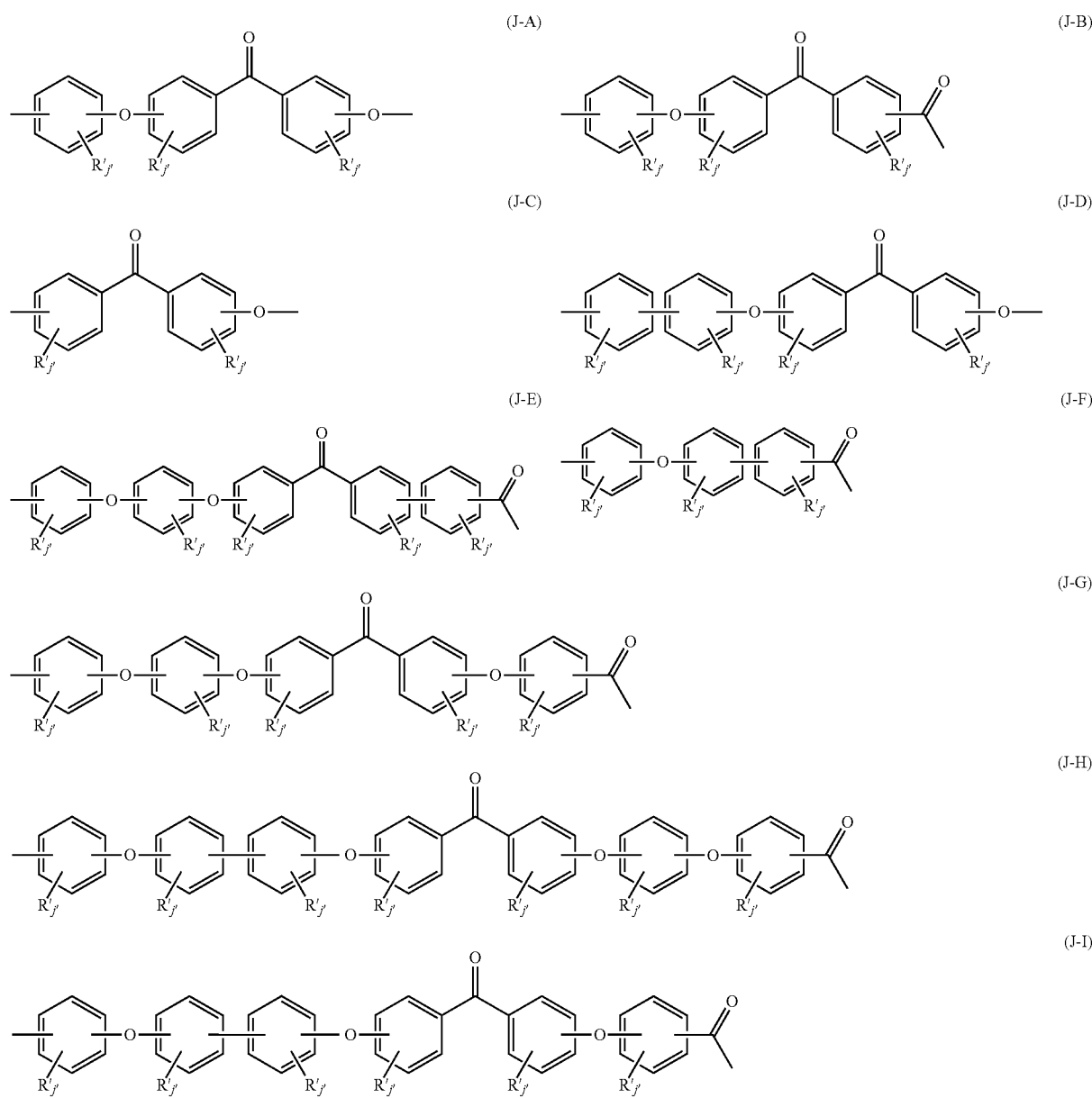

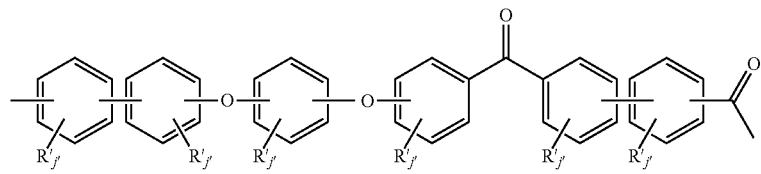
(J-J)

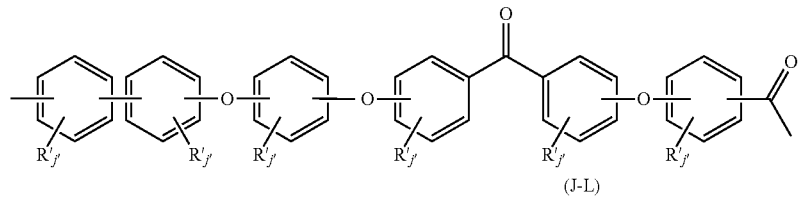
(J-K)

(J-L)

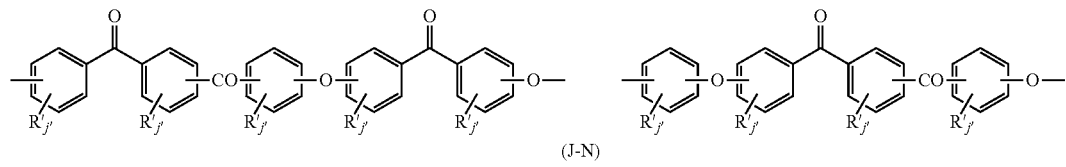
(J-M)

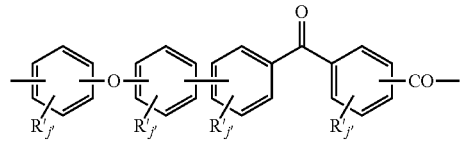
(J-N)

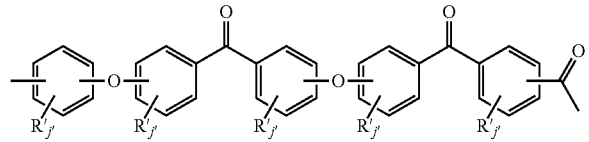
(J-O)

wherein:
 each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium; and
 j' is zero or is an integer from 0 to 4.

3. The fastener according to claim 1, wherein more than 50% moles of recurring units of the (PAEK) polymer are recurring units ($R_{PAEK}$) selected from those of formulae (J'-A) to (J'-O):

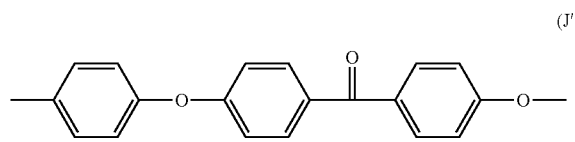
(J'-A)

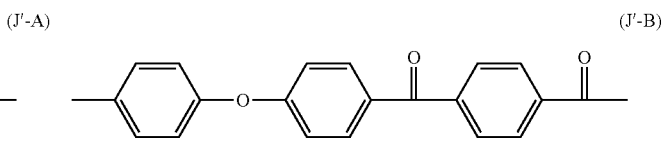
(J'-B)

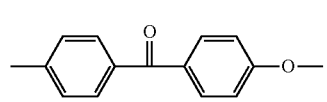
(J'-C)

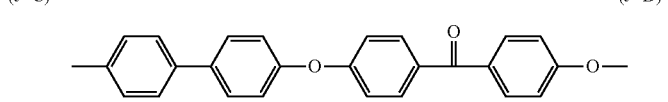
(J'-D)

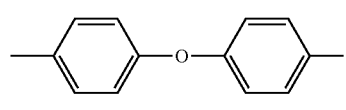
(J'-E)

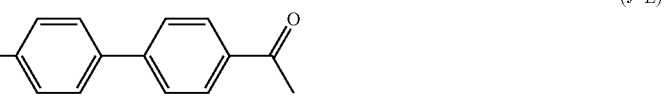
(J'-F)

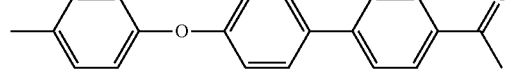
(J'-G)

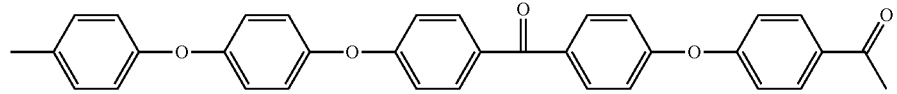

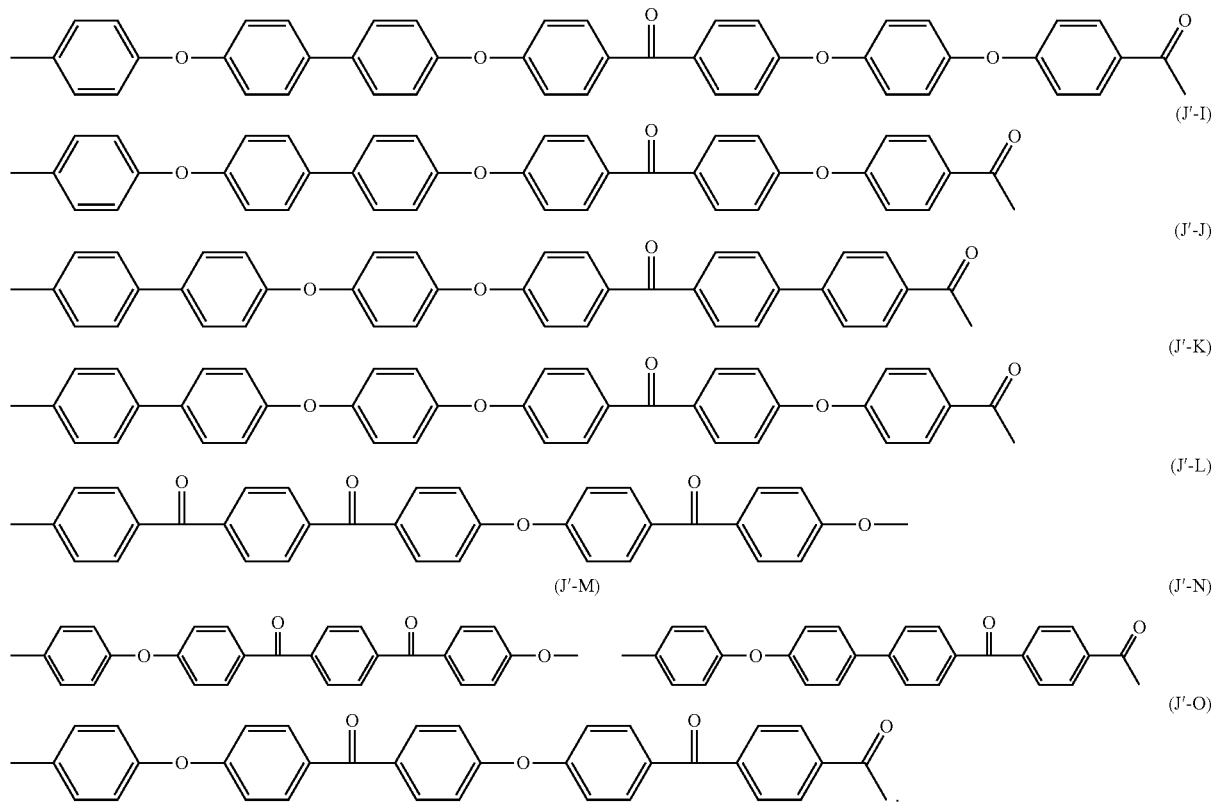

4. The fastener according to claim 1, wherein the nitride (NI) has an electronegativity of at least 1.6 to 2.5.

5. The fastener according to claim 1, wherein the nitride (NI) is boron nitride.

6. The fastener according to claim 1, wherein the nitride (NI) is present in an amount of at most 50.0% wt, based on a total weight of the polymer composition (C).

7. The fastener according to claim 1, wherein the polymer composition (C) further comprises at least one other thermoplastic polymer, (polymer T), different from the (PAEK) polymer.

8. The fastener according to claim 1, wherein the polymer composition (C) further comprises one or more ingredients other than the (PAEK) polymer, ingredient (I).

9. The fastener according to claim 1, wherein the polymer composition (C) further comprises at least one reinforcing filler.

10. The fastener according to claim 9, wherein the reinforcing filler is chosen from wollastonite and glass fiber.

11. The fastener according to claim 9, wherein the reinforcing filler is a carbon fiber.

12. The fastener according to claim 1, wherein said fastener consists essentially of the polymer composition (C).

13. A method for manufacturing the fastener according to claim 1, wherein the method comprises a step of injection molding and solidification of the polymer composition (C).

* * * * *